(12) United States Patent
Tseng

(10) Patent No.: US 7,902,704 B2
(45) Date of Patent: Mar. 8, 2011

(54) SPINDLE POSITIONING MEANS OF LINEAR ACTUATOR

(75) Inventor: Kuan-Shu Tseng, Xindian (TW)

(73) Assignee: T-Motion Technology Co., Ltd., Taipei (TW)

( * ) Notice: Subject to any disclaimer, the term of this patent is extended or adjusted under 35 U.S.C. 154(b) by 257 days.

(21) Appl. No.: 12/400,228

(22) Filed: Mar. 9, 2009

(65) Prior Publication Data
US 2010/0225187 A1   Sep. 9, 2010

(51) Int. Cl.
*H02K 7/06* (2006.01)
(52) U.S. Cl. .................... 310/83; 310/12.27
(58) Field of Classification Search ........ 310/12.01, 310/12.14, 12.27, 12.33, 80, 83
See application file for complete search history.

(56) References Cited

U.S. PATENT DOCUMENTS

| | | | | |
|---|---|---|---|---|
| 3,038,352 A * | 6/1962 | Murphy | ................ | 475/2 |
| 4,607,180 A * | 8/1986 | Stoody | ................ | 310/80 |
| 5,994,807 A * | 11/1999 | Coles et al. | ................ | 310/83 |
| 7,480,972 B2 * | 1/2009 | Schweinfurth et al. | ........... | 29/40 |
| 2005/0040715 A1 * | 2/2005 | Nesic | ................ | 310/71 |
| 2005/0104455 A1 * | 5/2005 | Migliori | ................ | 310/12 |
| 2006/0181161 A1 * | 8/2006 | Kawamoto et al. | ........... | 310/51 |
| 2007/0163541 A1 * | 7/2007 | Schweinfurth et al. | ........ | 123/396 |
| 2009/0295258 A1 * | 12/2009 | Caliendo et al. | ........... | 310/68 B |
| 2010/0225188 A1 * | 9/2010 | Tseng | ................ | 310/83 |

* cited by examiner

*Primary Examiner* — Thanh Lam
(74) *Attorney, Agent, or Firm* — Chun-Ming Shih; HDLS IPR Service

(57) ABSTRACT

A linear actuator includes a base having a positioning post and a motor fixed on one side of the base. A spindle positioning means includes a spindle, a seat and a fixing element. The spindle protrudes from the motor and penetrates the base. One side of the spindle away from the motor is formed with a free end. The seat includes a cylinder and an extension plate protruding outwards from the periphery of the cylinder. The extension plate is provided with a trough. The cylinder is connected to the free end of the spindle. The trough of the extension plate is located to correspond to the positioning post. The fixing element passes through the trough to fix the seat on the positioning post. Via this arrangement, the breakage of the spindle caused by a lateral force can be prevented efficiently.

7 Claims, 6 Drawing Sheets

SPINDLE POSITIONING MEANS OF LINEAR ACTUATOR

BACKGROUND OF THE INVENTION

1. Field of the Invention

The present invention relates to a spindle positioning means, and in particular to a spindle positioning means of a linear actuator.

2. Description of Prior Art

Linear actuator is used to drive a lead screw to rotate via a motor and a driving assembly including a worm screw and worm wheels. The lead screw drives a connected telescopic pipe to extend or retreat linearly. Thus, the linear actuator is widely applied to many apparatuses such as a hospital bed, electric chair or other fields in which an extending or retreating action is needed. Usually, the worm screw in a common linear actuator extends from the spindle center of the motor directly or is connected to the spindle center of the motor via a coupler. One end of the worm screw (i.e. the spindle center of the motor) away from the motor is formed with a free end naturally. During the transmission between the worm screw and the worm wheels, the worm screw is subjected a relatively large torsion force. Since the worm screw is supported at one side, the worm screw may be broken easily during the transmission between the worm screw and the worm wheels. Therefore, the Inventor aims to improve the conventional linear actuators.

In order to overcome the drawbacks of conventional linear actuators, the manufacturers in this field utilize materials of high strength to make the motor spindle. In addition to high price, such a high-strength spindle cannot be machined easily during the manufacturing process. Thus, such a product is high in price, so that it cannot be widely used in the industry. Most manufacturers utilizes the process shown in FIG. 1 to manufacture the linear actuator, in which a cover b on the worm screw a is provided with a supporting hole c whose diameter is significantly larger than that of the free end of the worm screw a, thereby using the supporting hole c to partially support the free end of the worm screw a. However, such a way of partially supporting the worm screw cannot overcome the problem that the worm screw may be broken due to a lateral action force. Therefore, there is still room for improvement.

SUMMARY OF THE INVENTION

The present invention is to provide a spindle positioning means of a linear actuator, whereby the free end of the spindle can be supported by a cylinder firmly. Thus, the breakage of the spindle caused by a lateral action force can be prevented efficiently.

The present invention is to provide a spindle positioning means of a linear actuator. The linear actuator includes a base having a positioning post and a motor fixed on one side of the base. The spindle positioning means includes a spindle, a seat and a fixing element. The spindle protrudes from the motor and penetrates the base. One side of the spindle away from the motor is formed with a free end. The seat comprises a cylinder and an extension plate protruding outwards from the periphery of the cylinder. The extension plate is provided with a trough. The cylinder is connected to the free end of the spindle. The trough of the extension plate is located to correspond to the positioning post. The fixing element passes through the trough to fix the seat on the positioning post.

In comparison with prior art, the present invention has advantageous features as follows. Since the free end of the spindle is supported by the cylinder sufficiently, it is unnecessary to manufacture the spindle with a high-strength steel material, which can reduce the material cost and manufacturing cost greatly. With the size of the periphery of the trough being larger than that of an outer thread, the machining or assembling errors between the spindle and the positioning post can be overcome efficiently, so that the cylinder can support the free end of the spindle sufficiently. With reinforcement ribs being formed between the cylinder and the extension plate, the supporting structure of the cylinder can be reinforced. Further, with the troughs being arranged at identical intervals, the action force of the spindle supported by the cylinder can be distributed uniformly.

DETAILED DESCRIPTION OF THE INVENTION

The characteristics and technical contents of the present invention will be explained with reference to the accompanying drawings. However, the drawings are illustrative only but not used to limit the present invention.

Figure 1:
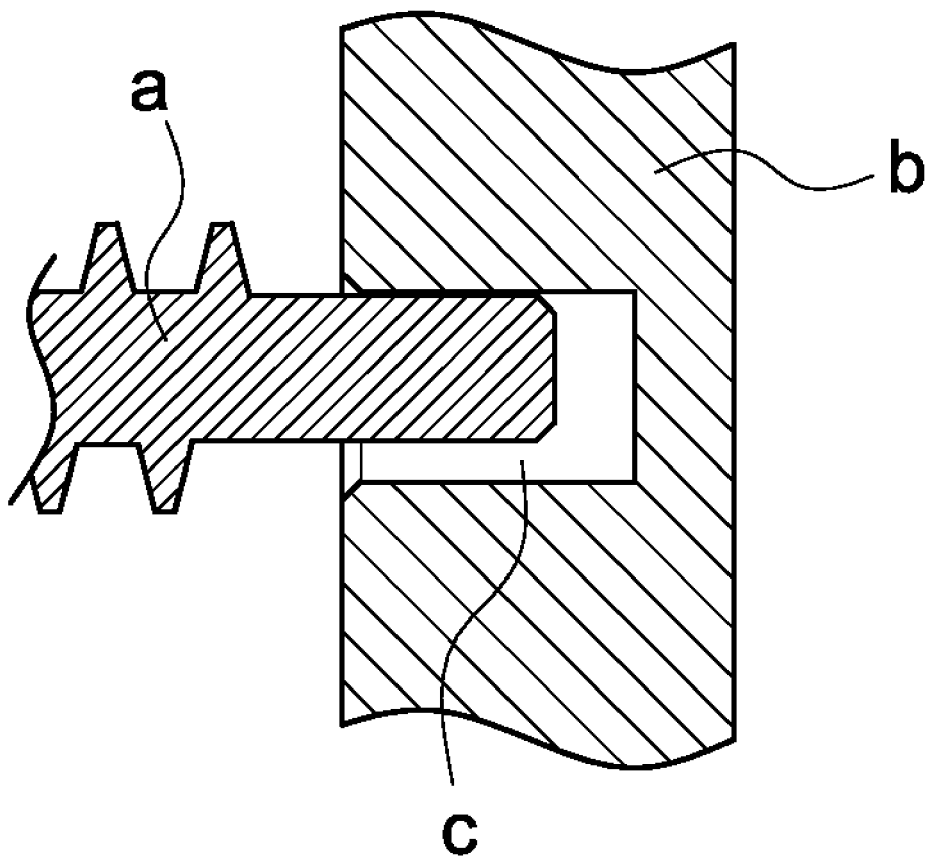
FIG. 1 is a cross-section view showing a conventional spindle-guiding means.
Figure 2:
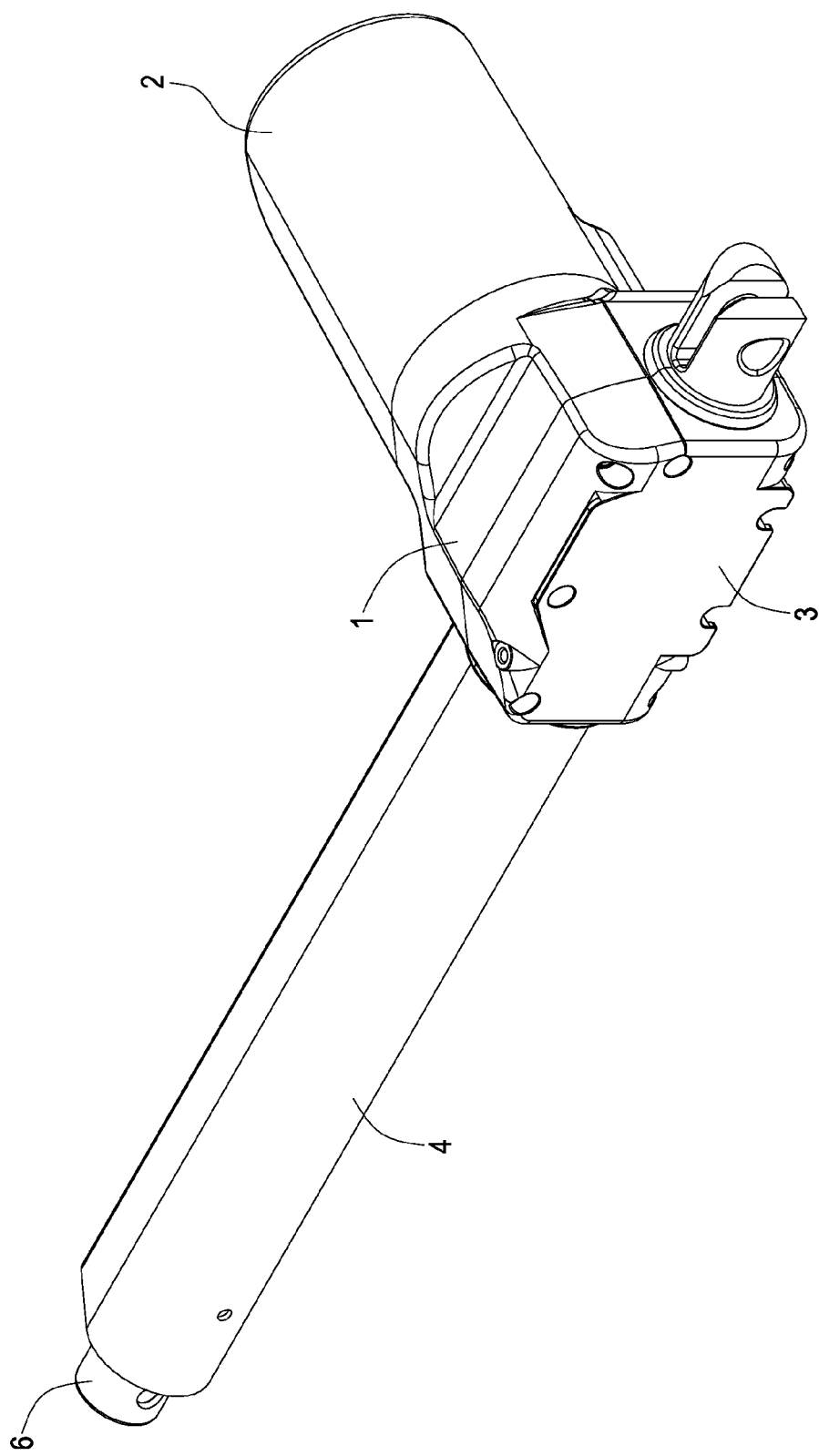
FIG. 2 is a perspective view showing the external appearance of the linear actuator of the present invention.
Figure 3:
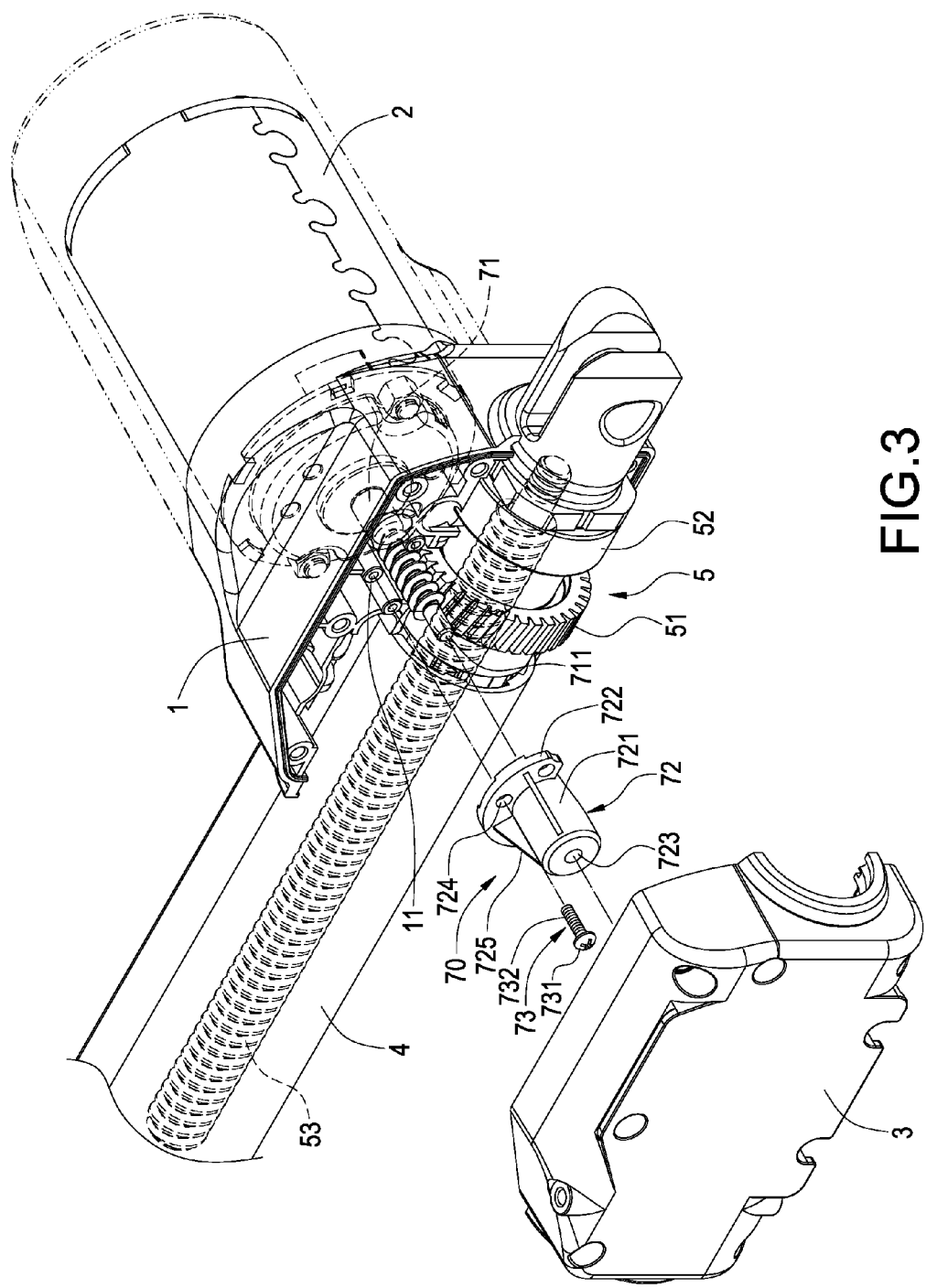
FIG. 3 is an exploded perspective view showing the linear actuator of the present invention.

Please refer to FIGS. 2 and 3. The present invention provides a spindle positioning means of a linear actuator. The linear actuator includes a base 1, an electric motor 2, a cover 3, an outer pipe 4, a transmission means 5 and a telescopic rod 6. The base 1 is substantially formed into an elongate rectangular frame with three positioning posts 11 protruding therein. The positioning posts 11 can be formed into a uniform shape. The electric motor 2 is fixed below the base 1. The cover 3 covers on the base 1. The outer pipe 4 is fixed to the base 1 via the cover 1 and is perpendicular to the electric motor 2. The space between the cover 3 and the base 1 is provided with the transmission means 6 including a worm wheel 51, a bearing 52 and a lead screw 53. The telescopic rod 6 is received in the outer pipe 4 and is threadedly connected with the lead screw (not shown) of the transmission means 5, so that the telescopic rod 6 can extend or retreat linearly with respect to the outer pipe 4.

Figure 4:
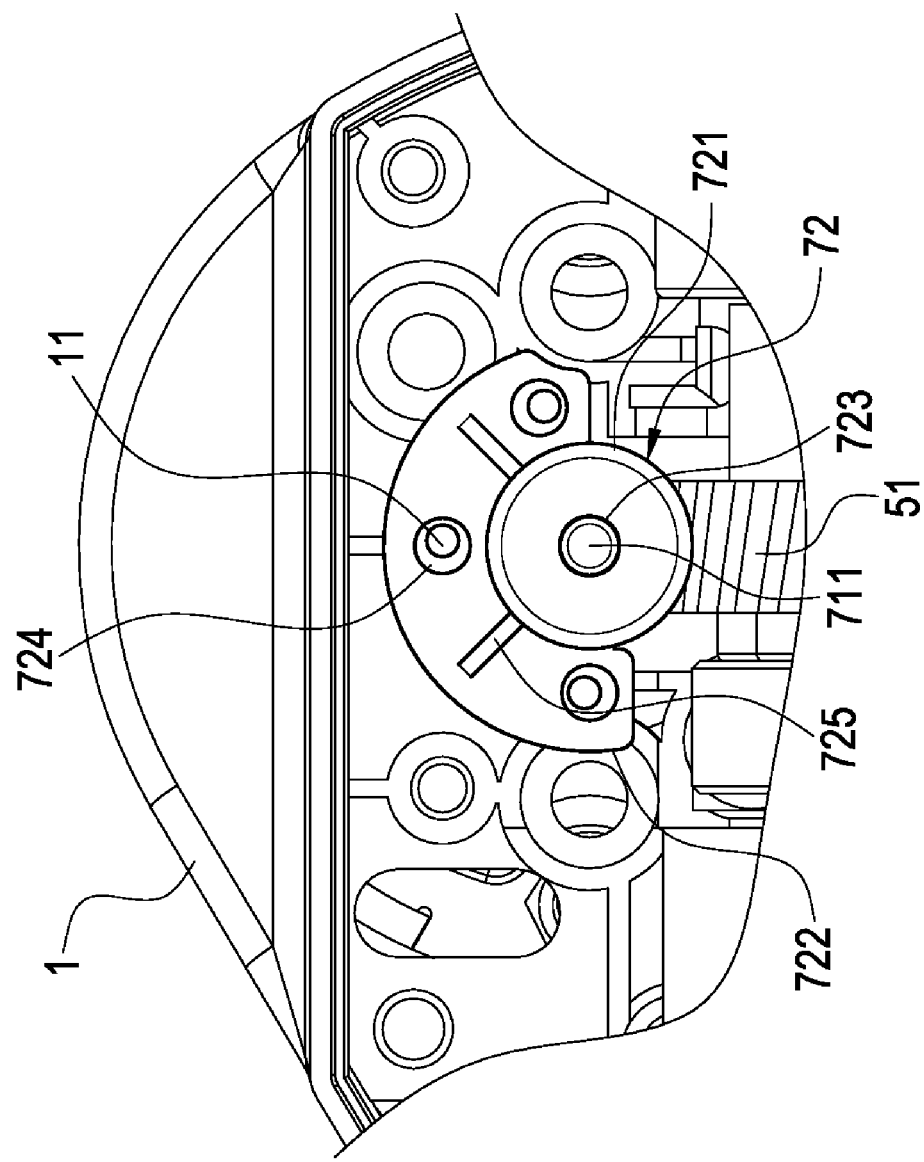
FIG. 4 is an assembled top view showing the spindle positioning means of the present invention.
Figure 5:
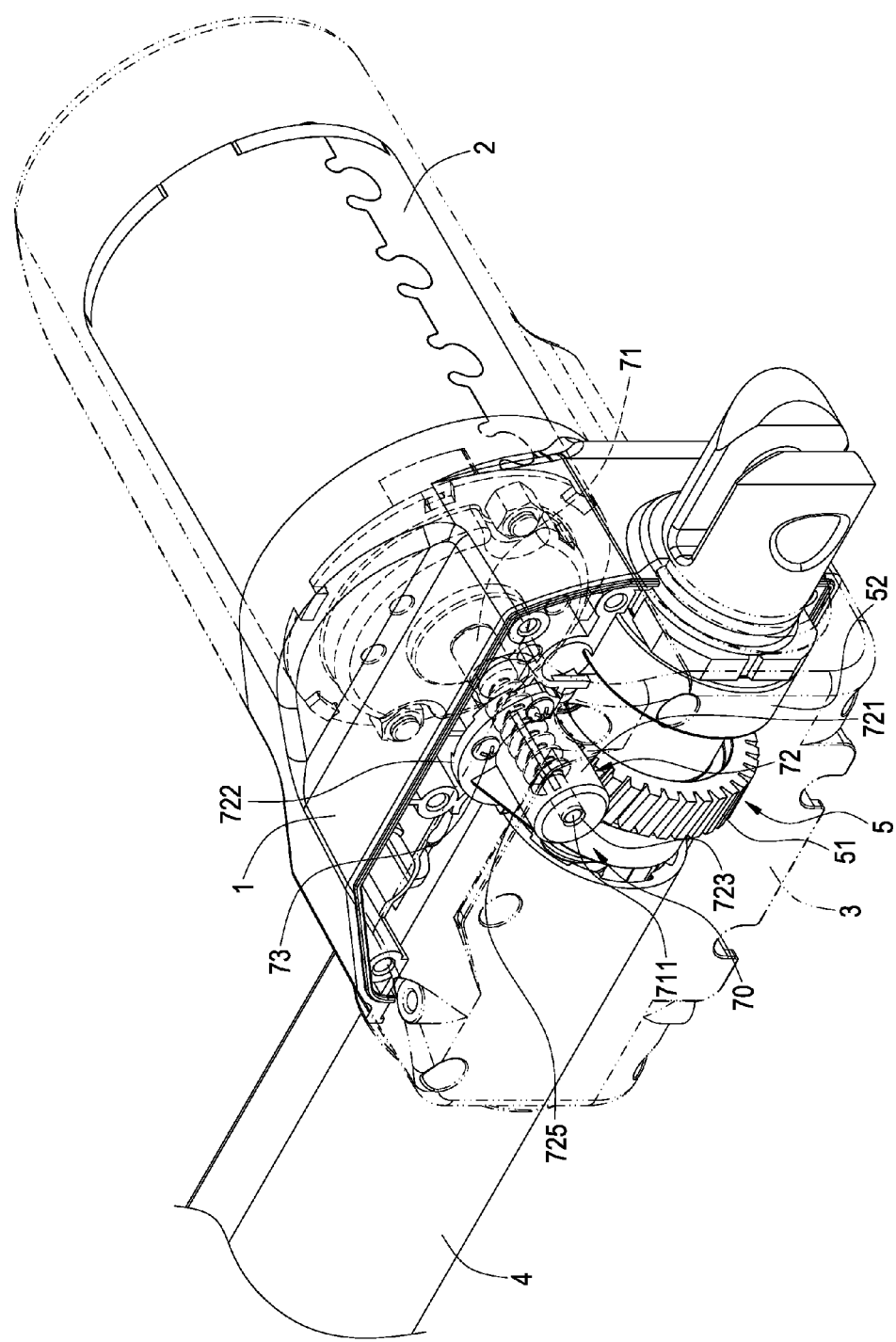
FIG. 5 is an assembled view showing the spindle positioning means of the present invention.
Figure 6:
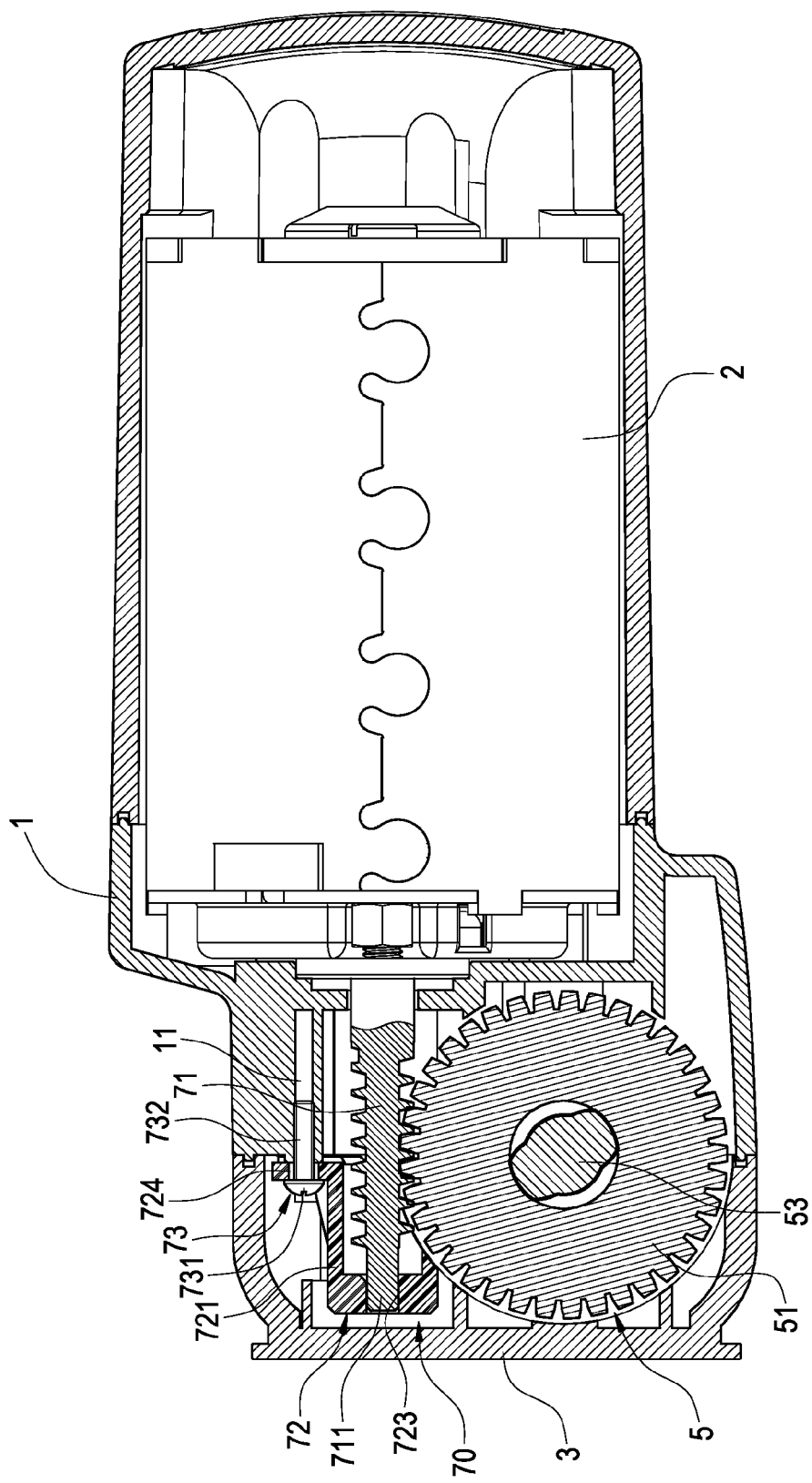
FIG. 6 is an assembled cross-sectional view showing the spindle positioning means of the present invention.

Please refer to FIGS. 3 to 6. The spindle positioning means 70 of the present invention includes a spindle 71, a seat 72 and a fixing element 73. The spindle 71 protrudes from the center of the electric motor 20 and penetrates the base 1. In the present embodiment, the spindle 71 is a worm screw that is drivingly engaged with the worm wheel 51 of the transmission means 5. One side of the spindle 71 away from the electric motor 20 is formed with a free end 711. The seat 72 comprises a cylinder 721 and a semi-annular extension plate 722 protruding from the bottom periphery of the cylinder 721. A through-hole 723 is provided on the cylinder 721. The inner diameter of the through-hole 723 is not smaller (i.e. identical to or larger than) the outer diameter of the free end 711. The difference between the inner diameter of the through-hole 723 and the outer diameter of the free end 711 is preferably in the range of 0-0.2 mm. Further, the through-hole 723 is connected to the free end 711 directly. Via this arrangement, the free end 711 can be supported by the through-hole 723 sufficiently. The extension plate 722 is provided with three circular troughs 724 (FIG. 4). The troughs 724 can be formed into a uniform shape. Further, the outer peripheral surface of the cylinder 721 and the top surface of the extension plate 722 are provided with a plurality of reinforcing ribs 725 that are arranged at intervals. In the present embodiment, the fixing element 73 is a screw, but it is not limited thereto. The fixing element 73 has a head 731 and an outer thread 732 extending from the head 731. The size of the periphery of the outer thread 732 is smaller than that of the periphery of the head 731. The size of the inner edge of the trough 724 is larger than that of the periphery of the outer thread 732 of the fixing element 73. Further, the trough 724 is shaped as a capsule or other geometries, thereby increasing the positional correspondence between the troughs 724 and the positioning posts 11.

The through-hole 723 of the cylinder 721 is connected to the free end 711 of the spindle 71. The size of the inner edge of the trough 724 is larger than that of the periphery of the outer thread 732 of the fixing element 73. Each of the troughs 724 of the extension plate 722 is located corresponding to the respective positioning post 11. Each of the fixing elements 73 passes through the respective troughs 724 to threadedly fix the seat 72 to the respective positioning posts 11.

According to the above, the spindle positioning means of the linear actuator of the present invention demonstrates industrial applicability, novelty and inventive steps. Further, the structure of the present invention has not been seen in the products of the same kind or let in public use. Therefore, the present invention conforms to the requirements for a utility model patent.

What is claimed is:

1. A spindle positioning means of a linear actuator, the linear actuator comprising a base and a motor fixed to one side of the base, the base having a positioning post, the spindle positioning means comprising:

a spindle protruding from the motor and penetrating the base, one side of the spindle away from the motor being formed with a free end;

a seat having a cylinder and an extension plate protruding outwards from a periphery of the cylinder, the extension plate being provided with a trough; and a fixing element;

wherein the cylinder is connected to the free end of the spindle exactly, the trough of the extension plate is positioned to correspond to the positioning post, and the fixing element passes through the trough to fix the seat to the positioning post.

2. The spindle positioning means of linear actuator according to claim 1, wherein the cylinder has a through-hole, an inner diameter of the through-hole is not smaller than an outer diameter of the free end, and the through-hole is connected to the free end.

3. The spindle positioning means of linear actuator according to claim 2, wherein a difference between the inner diameter of the through-hole and the outer diameter of the free end is in range of 0-0.2 mm.

4. The spindle positioning means of linear actuator according to claim 1, wherein the fixing element has a head and an outer thread extending from the head, the size of the periphery of the outer thread is smaller than that of the periphery of the head, the size of the inner edge of the trough is larger than that of the periphery of the outer thread for allowing the outer thread to pass through.

5. The spindle positioning means of linear actuator according to claim 4, wherein the trough is a circular trough.

6. The spindle positioning means of linear actuator according to claim 4, wherein the trough is a capsular trough.

7. The spindle positioning means of a linear actuator according to claim 1, wherein the outer peripheral surface of the cylinder and the top surface of the extension plate are provided with a plurality of reinforcing ribs that are arranged at intervals.

* * * * *